(12) United States Patent
Bruno (10) Patent No.: US 10,848,081 B2
(45) Date of Patent: Nov. 24, 2020

(54) MOTOR CONTROL DEVICE

(71) Applicant: SOMFY SAS, Cluses (FR)

(72) Inventor: Serge Bruno, Marnaz (FR)

(73) Assignee: SOMFY SAS, Cluses (FR)

( * ) Notice: Subject to any disclaimer, the term of this patent is extended or adjusted under 35 U.S.C. 154(b) by 941 days.

(21) Appl. No.: 14/901,050

(22) PCT Filed: Jun. 24, 2014

(86) PCT No.: PCT/FR2014/051613
§ 371 (c)(1),
(2) Date: Dec. 27, 2015

(87) PCT Pub. No.: WO2014/207387
PCT Pub. Date: Dec. 31, 2014

(65) Prior Publication Data
US 2016/0373036 A1     Dec. 22, 2016

(30) Foreign Application Priority Data

Jun. 27, 2013 (FR) .................................. 13/56183

(51) Int. Cl.
*H02P 6/16* (2016.01)
*H02P 6/18* (2016.01)
(Continued)

(52) U.S. Cl.
CPC .............. *H02P 6/16* (2013.01); *H02P 6/182* (2013.01); *H02P 6/187* (2013.01); *H02P 6/188* (2013.01); *H02P 27/08* (2013.01)

(58) Field of Classification Search
CPC .. H02P 6/16; H02P 6/182; H02P 6/187; H02P 6/188; H02P 27/08
See application file for complete search history.

(56) References Cited

U.S. PATENT DOCUMENTS 4,933,611 A * 6/1990 Albanesius ............... H02P 3/12
                                                    318/285
5,557,182 A * 9/1996 Hollenbeck ........ G05D 16/2066
                                                    318/432
(Continued)

FOREIGN PATENT DOCUMENTS

EP         0661800 A1    7/1995
FR         2864373 A1    6/2005
(Continued)

OTHER PUBLICATIONS

International Search Report dated Sep. 5, 2014 re: Application No. PCT/FR2014/051613; citing: US 2011/084639 A1, WO 2009/068314 A2, US 2009/189556 A1, EP 0661800 A1, FR 2956528 A1 and FR 2864373 A1.

*Primary Examiner* — Zoheb S Imtiaz
(74) *Attorney, Agent, or Firm* — Cantor Colburn LLP (57) ABSTRACT

A device for controlling a motor having a stator and a rotor, the stator being provided with at least one winding, the motor being controlled by a control module, the control device including: at least one transformation module for transforming a source signal taken from at least one of the terminals of the winding into a floating image signal representative of a counter-electromotive force induced in the winding. The transformation module has: a time constant determined from characteristics of the motor and/or characteristics of the control module; at least one first terminal connected to at least one of the terminals of the winding, and a second terminal, the first and second terminals being likely to have floating potential relative to the fixed reference terminal.

12 Claims, 8 Drawing Sheets

(51) Int. Cl.
H02P 6/182 (2016.01)
H02P 27/08 (2006.01)

(56) References Cited

U.S. PATENT DOCUMENTS

| | | | | |
|---|---|---|---|---|
| 5,764,244 A * | 6/1998 | Bruhn | ............ | G01D 15/24 |
| | | | | 346/31 |
| 6,583,728 B1 * | 6/2003 | Staerzl | ............ | B63B 39/061 |
| | | | | 114/144 R |
| 2009/0079374 A1 * | 3/2009 | De Four | ............ | H02P 6/182 |
| | | | | 318/400.34 |
| 2009/0189556 A1 * | 7/2009 | Itagaki | ............ | H02P 6/181 |
| | | | | 318/400.11 |
| 2011/0084639 A1 * | 4/2011 | Brown | ............ | H02P 6/188 |
| | | | | 318/400.35 |
| 2014/0361701 A1 * | 12/2014 | Siessegger | ............ | H05B 45/20 |
| | | | | 315/200 R |

FOREIGN PATENT DOCUMENTS

FR          2956528 A1    8/2011
WO    2009068314 A2    6/2009

* cited by examiner

MOTOR CONTROL DEVICE

TECHNICAL FIELD

The present invention concerns a motor control device and a motor control method.

The invention finds its application for controlling an electronically controlled motor, such as a <<brushless>> motor or a motor <<without collector>>.

BACKGROUND

A <<brushless>> motor (also called BLDC) conventionally includes a rotor comprising a plurality of permanent magnets, and a stator comprising a plurality of windings.

The stator windings are sequentially supplied by a control module in order to generate a rotating magnetic field. The permanent magnets of the rotor seek constantly to be oriented in the direction of the magnetic field.

For the motor to run, the supply of the windings must be controlled so that the rotating magnetic field remains ahead of the permanent magnets of the rotor. Thus, a motor torque is produced.

Information on the position of the rotor is therefore necessary to determine the appropriate switching moments.

To this end, a known solution consists of placing Hall effect sensors and detecting the passage of the magnetic poles through predetermined points.

A disadvantage of such a solution is that the addition of sensors leads to an additional cost to the manufacturer and increases the risk of breakdown.

Another known solution consists of measuring the actual signal of the counter-electromotive force at the terminals of a winding at a time window during which the terminals of the winding are disconnected from the terminals of a power supply. The position of the rotor can then be deduced from the thus measured signal.

A disadvantage of such a solution is that it is difficult to take off permanently the actual signal of the counter-electromotive force. Consequently, it is possible to know the rotor position only momentarily, around the passages of the signal through zero. A significant calculation power is necessary for the management of the signal acquisition windows.

Furthermore, the actual signal of the counter-electromotive force has a low signal/noise ratio. Also, a significant calculation power is required to digitally filter the noise.

Thus, when the motor is running at low speed, for example in start-up or shutdown phase, the amplitude of the actual signal of the counter-electromotive force, and then the amplitude of the signal processed by the processing module, are low. It is difficult to accurately deduce the passages through zero of the actual signal of the counter-electromotive force and the position of the rotor.

BRIEF SUMMARY

The invention aims to overcome all or part of these disadvantages.

The invention concerns a motor control device of the type comprising a stator and a rotor, the stator being provided with at least one winding, the motor being driven by:
- a control module enabling to select, according to a predetermined control law, for the terminals of the at least one winding:
  - a configuration connected to one of the terminals of a power supply source referenced relative to a fixed reference terminal; and
  - a configuration disconnected from the terminals of the power supply source;

characterized in that the control device includes
at least one transformation module enabling to transform a source signal taken off at least at one of the terminals of the winding into a floating image signal representative of a counter-electromotive force induced in the winding, the transformation module having:
- a time constant determined from the motor and/or the control module characteristics;
- at least a first terminal connected to said at least one of the terminals of the winding, and a second terminal, the first and second terminals being likely to have a floating potential relative to the fixed reference terminal, the source signal being taken off between the first and second terminals.

The expression <<terminal of a winding>> can refer to an end of a winding, an intermediate point of the winding, or even an end or an intermediate point of an additional winding associated with said winding, for example for measuring the magnetic flux therefrom.

The expression <<floating image signal representative of a counter-electromotive force>> means a signal of the same frequency as the actual signal of the counter-electromotive force. The floating image signal can however have an amplitude and a distinct phase of the actual signal of the counter-electromotive force.

The term <<connect>> extends in its broadest meaning, that is to say <<connect directly or indirectly>>.

The expression <<control module characteristic>> means a hardware or software characteristic of the control module.

The expression <<terminal likely to have a floating potential relative to the fixed reference terminal>> means a terminal disconnected from the fixed reference terminal for at least a determined duration.

The device according to the invention is advantageous in that it enables to continuously obtain a floating image signal representative of the counter-electromotive force.

The amplitude of the floating image signal is not deteriorated by the transformation module. Also, when the motor is in start-up phase, it is still possible to obtain a floating image signal reliably.

In addition, the parasitic frequencies generated by the control module are eliminated due to the choice of the time constant of the transformation module.

Thus, the floating image signal has an excellent signal/noise ratio and is obtained without calculation. From the floating image signal, it is then possible to deduce some characteristics of the actual signal of the counter-electromotive force, such as the passages through zero or through predetermined values.

The device according to the invention may include one or more of the following characteristics.

According to a first possibility, the second terminal of the at least one transformation module is connected to another terminal of the winding.

According to a second possibility, the second terminal of the at least one transformation module forms a floating reference terminal.

Preferably, the control module has:
- a plurality of switches capable of switching between an on-state and an off-state;
- a plurality of freewheel diodes, each mounted parallel to a respective switch, such that on every switching of a switch from its on-state to its off-state, the winding discharges through a freewheel diode; and the time constant of the at least one transformation module is greater than or equal to the conduction time of each freewheel diode.

By <<conduction time of a freewheel diode>> it is meant the time necessary for the winding to completely discharge through the freewheel diode, when the switch associated with the freewheel diode switches from its on-state to its off-state.

Such an arrangement ensures that the floating image signal is not canceled before the winding is completely discharged after a switching.

Thus, when the control law comprises a succession of sequences, the sequences are in succession always following a determined order. The rotation of the rotor is ensured without risk of oscillation.

Advantageously, the time constant of the at least one transformation module is greater than or equal to the electrical time constant of the motor, The electrical time constant of the motor is defined by the ratio L/R, wherein L is the inductance value of the winding and R is the resistance value of the winding.

This electrical time constant of the motor is greater than the conduction time of each freewheel diode. Such a particular case allows simplifying the design of the transformation module since it allows sizing the time constant of the transformation module only depending on the characteristics of the motor.

According to one characteristic, the frequency of the counter-electromotive force induced in the winding is likely to vary in a determined frequency band; and The at least one transformation module is configured to:
keep the frequency components of the source signal which are comprised in the determined frequency band; and
cut the frequency components of the source signal which are not comprised in the determined frequency band.

The frequency of the counter-electromotive force induced in the winding varies depending on the rotation speed of the rotor. Such a transformation module allows improving the signal/noise ratio of the floating image signal by deleting the frequency components outside the determined frequency band.

Thus, when the control law uses a pulse width modulation (PWM), the transformation module attenuates the frequency components resulting from this modulation.

As an example, the transformation module can comprise a low-pass filter or a band-pass filter.

Advantageously, the device includes at least one referencing module designed to transform the floating image signal into a signal referenced relative to the fixed reference terminal, this referencing module comprising:
an input stage connected to the at least one transformation module; and
an output stage isolated from the input stage.

Such a referenced signal is likely to undergo an analog/digital conversion, while this was difficult for the floating image signal.

According to one possibility, the output stage is galvanically isolated from the input stage, for example by transformers or optocouplers.

According to another possibility, the output stage has an impedance greater than the input stage so as to prevent the circulation of a current, for example by using insulating operational amplifiers.

Preferably, the at least one referencing module is designed to transform the floating image signal into a signal referenced relative to the fixed and binarized reference terminal and taking:
a first predetermined value when the floating image signal at the terminals of the input stage is greater than a threshold; and
a second predetermined value if not.

According to one characteristic, the referencing module comprises a means for adjusting the threshold value.

Thus, it is possible to set the phase-shift introduced by the referencing module. For example, the adjustment means can be a resistance connected at the input of the referencing module.

According to one embodiment, the at least one referencing module comprises a first and a second optocouplers, comprising respectively a first and a second light-emitting diodes, and a first and a second phototransistors, the anode of the first diode being connected to the cathode of the second diode and the anode of the second diode being connected to the cathode of the first diode.

It is then possible to use the referenced and binarized signal to determine accurately the duty factor of the actual signal of the counter-electromotive force.

The used information are for example the knowledge of rising and falling edges of the referenced and binarized signal and the knowledge of the phase-shifts introduced by the transformation module and the referencing module.

Advantageously, the at least one referencing module comprises an optocoupler.

Preferably, the device includes a digital processing module connected to the at least one referencing module, designed to process the referenced and binarized signal output by the at least one referencing module so as to:
generate a succession of switching sequences according to the control law of the control module; and/or
count the number of revolutions performed by the rotor; and/or
determine the position of the rotor.

In a preferred embodiment, the motor is a brushless motor comprising three windings connected following a triangle or a star topology, the device comprising
three transformation modules, each associated with a respective winding and connected following a triangle or a star topology relative to the terminals of the windings; and
three referencing modules connected following a triangle or a star topology relative to the transformation modules.

The invention also concerns a method for controlling a motor of the type comprising a stator and a rotor, the stator being provided with at least one winding, the motor being driven by a control module enabling to select, according to a predetermined control law, for the terminals of the at least one winding:
a configuration connected to one of the terminals of a supply power source referenced relative to a fixed reference terminal; and
a configuration disconnected from the terminals of the supply power source, the method comprising:
a step of taking off at least one source signal at least at one terminal of the winding;
a first step of transforming at least one source signal into at least one floating image signal representative of a counter-electromotive force induced in the winding.

Preferably, the method includes a second step of transforming the at least one floating image signal so as to output at least one signal referenced relative to a fixed reference terminal.

Preferably, the method further includes:
a step of binarizing at least one referenced signal; and
a step of generating a succession of switching sequences of the control module, from
the referenced and binarized signal, and
the predetermined control law,
by applying a predetermined correction that takes into account at least one delay introduced during transformation steps.

According to one possibility, the correction applied is predetermined during a design phase depending on the electronic components constituting the transformation modules.

Alternatively, the applied correction can take several predetermined values during a design phase, depending on ranges of values of at least one operating parameter, and the method further including a step of measuring the at least one operating parameter, the applied correction being selected among the predetermined values, depending on the measured value of the at least one operating parameter.

BRIEF DESCRIPTION OF THE DRAWINGS

The invention will be better understood using the following description, with reference to the appended schematic drawings representing, by way of example, two control devices according to the invention and signals processed by these devices.

DETAILED DESCRIPTION

Figure 1:
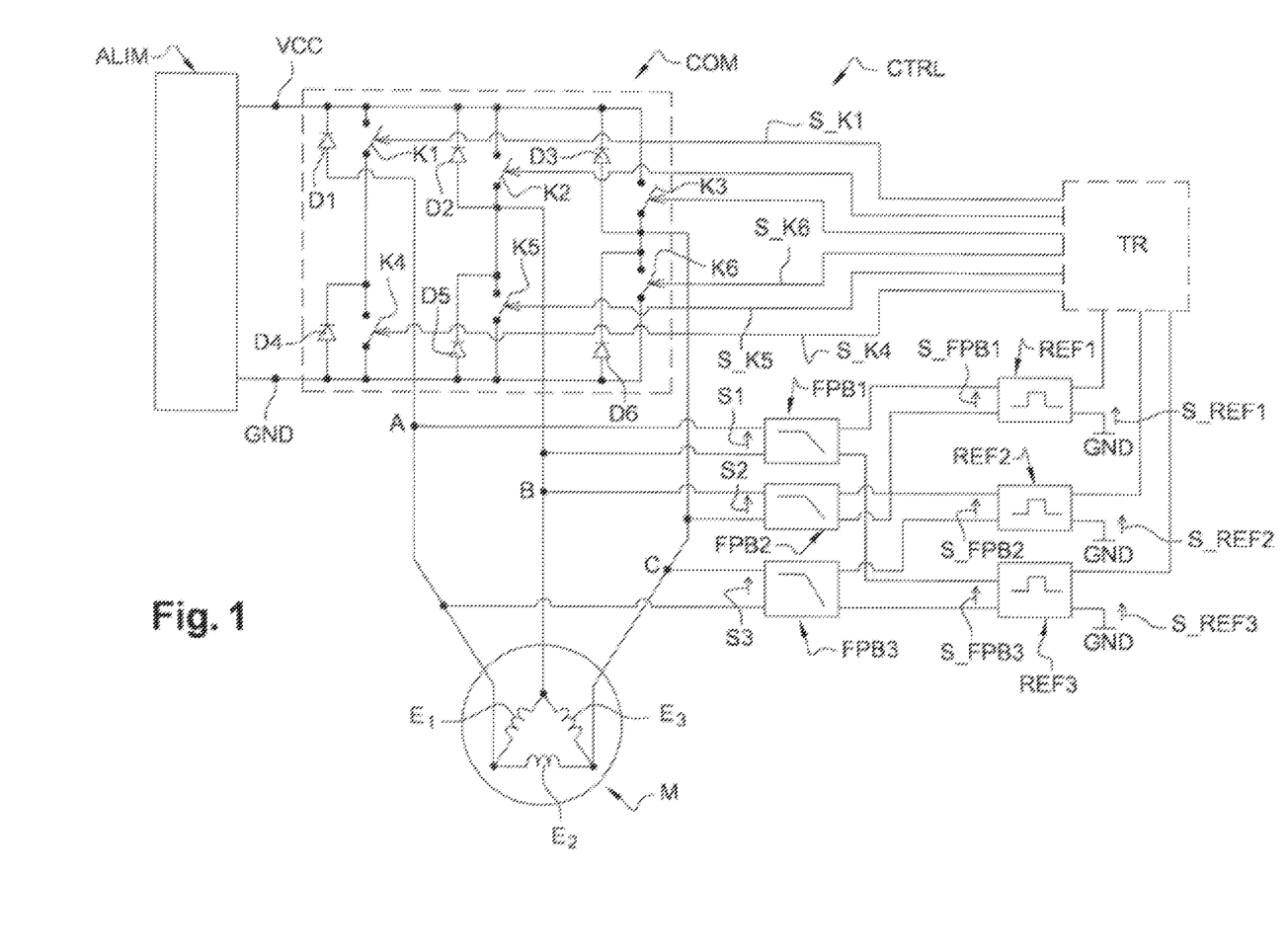
FIG. 1 is a schematic representation of a first motor control device according to the invention.

FIG. 1 represents a control device CTRL for a brushless and three-phase motor M.

The motor M includes a stator and a rotor. The stator is provided with three windings E1, E2 and E3 connected in triangle by their terminals A, B and C. The rotor is provided with three permanent magnets.

The motor M is driven by a control module COM enabling to select, according to a predetermined control law, for the terminals A, B and C:
a configuration connected to one of the terminals V or GND of a power supply source ALIM; and
a configuration disconnected from the terminals V and GND of the power supply source ALIM.

The power supply source ALIM is referenced relative to the terminal GND which is a fixed reference terminal.

The control module COM comprises switches K1, K2, K3, K4, K5 and K6, for example transistors or relays capable of switching between an on-state and an off-state.

The switching of the switches K1, K2, K3, K4, K5 and K6 is controlled by signals S_K1, S_K2, S_K3, S_K4, S_K5 and S_K6 forming said control law.

The control law is divided into a succession of switching sequences, each sequence corresponding to a set of signals S_K1, S_K2, S_K3, S_K4, S_K5 and S_K6 during a determined duration.

The control module COM also comprises freewheel diodes D1, D2, D3, D4, D5 and D6, each mounted parallel to a respective switch K1, K2, K3, K4, K5 and K6 or integrated in these switches.

For each switching of a switch K1, K2, K3, K4, K5 and K6 from its on-state to its off-state, one of the windings E1, E2 and E3 discharges through a freewheel diode D1, D2, D3, D4, D5 and D6.

The conduction time of the freewheel diodes D1, D2, D3, D4, D5 and D6 depends on structural characteristics of the switches K1, K2, K3, K4, K5 and K6 and the diodes D1, D2, D3, D4, D5 and D6, as well as on the current intensity present in the windings E1, E2 and E3 at the switching moment.

The control device CTRL includes three transformation modules FPB1, FPB2 and FPB3.

Figure 6:
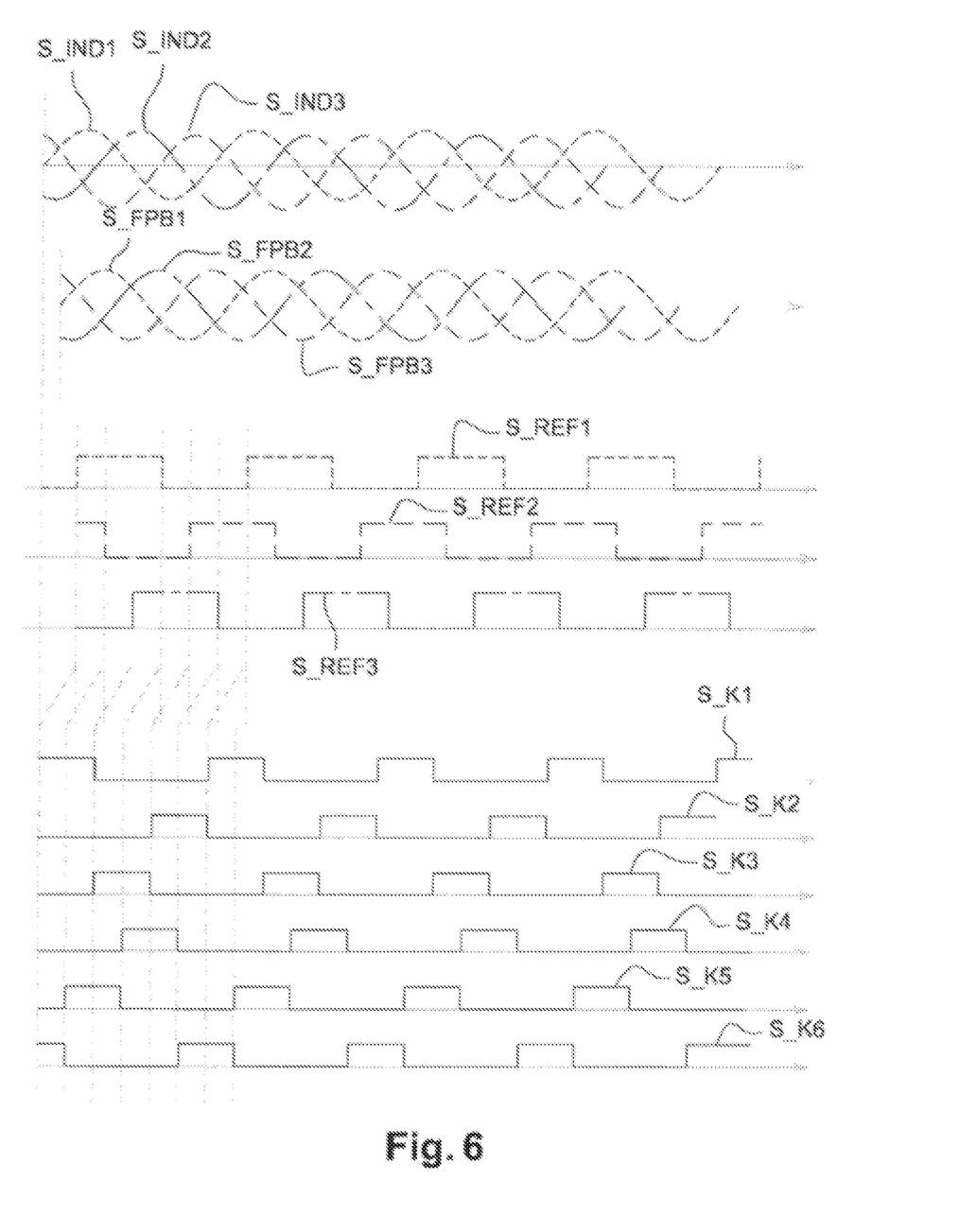
FIG. 6 is a representation of a control law implemented by a control module of the device of FIG. 1.

The transformation modules FPB1, FPB2 and FPB3 are configured for transforming source signals S1, S2, S3 taken off at the terminals of the windings E1, E2 and E3 into floating image signals S_FPB1, S_FPB2 and S_FPB3 representative of actual signals of the counter-electromotive force S_IND1, S_IND2 and S_IND3 (shown in FIG. 6) induced in the windings E1, E2 and E3.

The floating image signals S_FPB1, S_FPB2 and S_FPB3 have the same frequency as the actual signals of the counter-electromotive force S_IND1, S_IND2 and S_IND3.

As a condition of use, the actual signals of the counter-electromotive force S_IND1, S_IND2 and S_IND3 vary in a determined frequency band.

The transformation modules FPB1, FPB2 and FPB3 are configured to:
keep the frequency components of the source signal S1, S2 and S3 which are comprised in the determined frequency band; and
cut the frequency components of the source signal S1, S2 and S3 which are not comprised in the determined frequency band.

The transformation modules FPB1, FPB2, and FPB3 have time constants greater than the conduction time of the freewheel diodes D1, D2, D3, D4, D5 and D6 in the considered application, and greater than the electrical time constant of the motor M.

Figure 10:
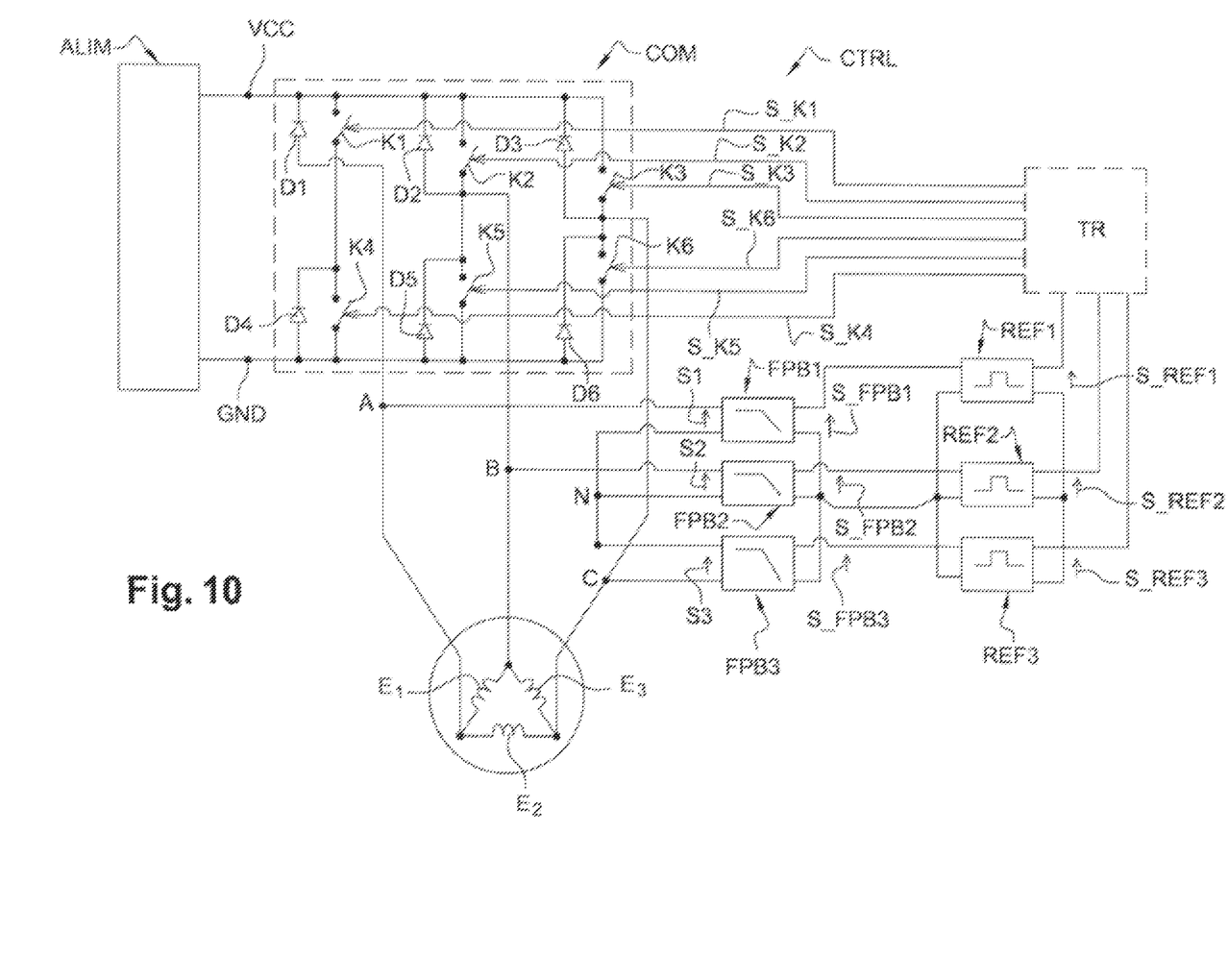
FIG. 10 is a schematic representation of a second motor control device according to the invention.

In the embodiment of FIG. 1, the transformation modules FPB1, FPB2, and FPB3 comprise low-pass filters and are connected to the terminals A, B and C following a triangle topology. Another connection following a star topology between the transformation modules FPB1, FPB2, and FPB3 and the terminals A, B, C, is illustrated in FIG. 10.

The transformation modules FPB1, FPB2 and FPB3 introduce a delay θ1 of the signals S_FPB1, S_FPB2 and S_FPB3 relative to the signals S_IND1, S_IND2 and S_IND3.

This delay θ1 varies depending on operating parameters (the motor speed, the motor torque, the current intensity in the windings, the temperature), and also depending on electrical characteristics (L, R) of the windings E1, E2 and E3 of the motor, and on electronic components constituting the transformation modules FPB1, FPB2, FPB3.

The delay θ1 may vary between two values θ1min and θ1MAX, which can be determined in the design phase, taking into account extreme operating conditions of the application. The θ1min and θ1MAX values can be adjusted by selecting the electronic components constituting the transformation modules FPB1, FPB2, FPB3.

Thus the variation of the delay θ1 introduced by the transformation modules FPB1, FPB2 and FPB3 can be framed in the design phase.

The control device CTRL includes three referencing modules REF1, REF2 and REF3 designed to transform the floating image signals S_FPB1, S_FPB2 and S_FPB3 into signals S_REF1, S_REF2 and S_REF3 referenced relative to the fixed reference terminal GND and binarized.

Each referencing module REF1 comprises:
- an input stage 10 whose terminals are connected to output terminals of the transformation module FPB1; and
- an output stage 12 galvanically isolated from the input stage 10.

The referencing modules REF1, REF2 and REF3 are identical. Also, only the referencing module REF1 is described later.

In a first embodiment (shown in FIGS. 2 and 3), the referencing module REF1 comprises two optocouplers 14 and 16.

Figure 2:
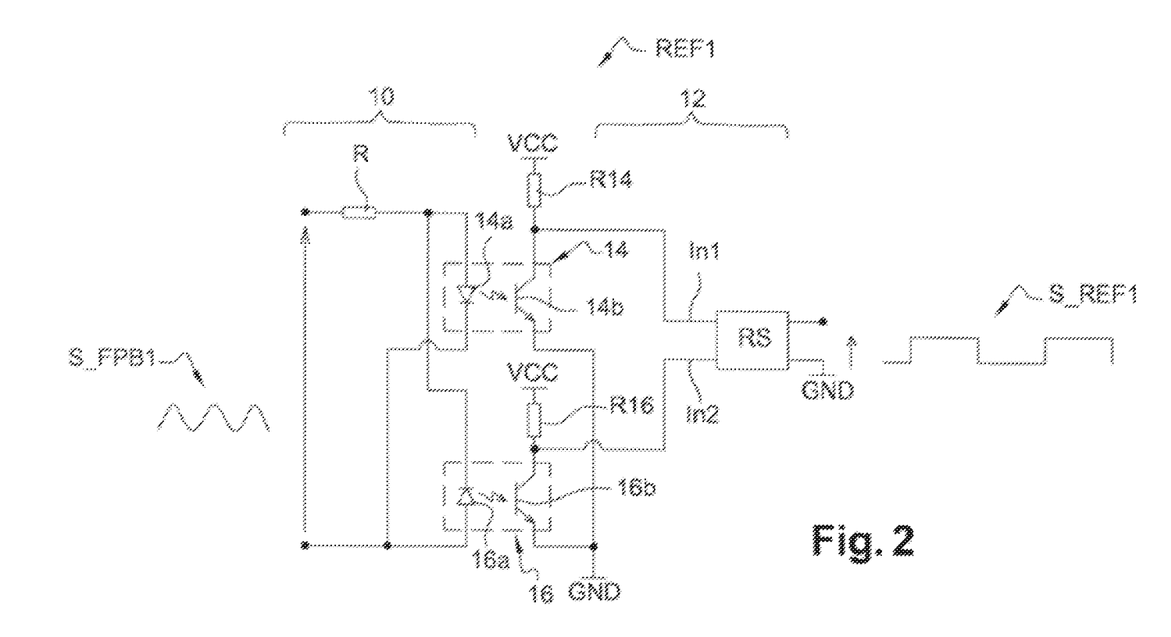
FIG. 2 is a schematic representation of a referencing module of the control device of FIG. 1.

Each optocoupler 14, 16 has a light-emitting diode 14a, 16a connected to the terminals of the input stage 10 and a phototransistor 14b, 16b connected to the terminals of the output stage 12.

The anode of the first diode 14a is connected to the cathode of the second diode 16a and vice versa.

The light-emitting diode 14a is designed to emit light only when the floating image signal S_FPB1 at the terminals of the input stage 10 is greater than a value +V_SEUIL.

The light-emitting diode 16a is designed to emit only when the floating image signal S_FPB1 at the terminals of the input stage 10 is smaller than a value −V_SEUIL.

The phototransistors 14b, 16b are connected to a power supply terminal VCC through resistances R14 and R16, respectively.

The outputs of the two optocouplers are connected to the input terminals In1 and In2 of a flip-flop RS. The signal S_REF1 is generated by the flip-flop RS.

Figure 3:
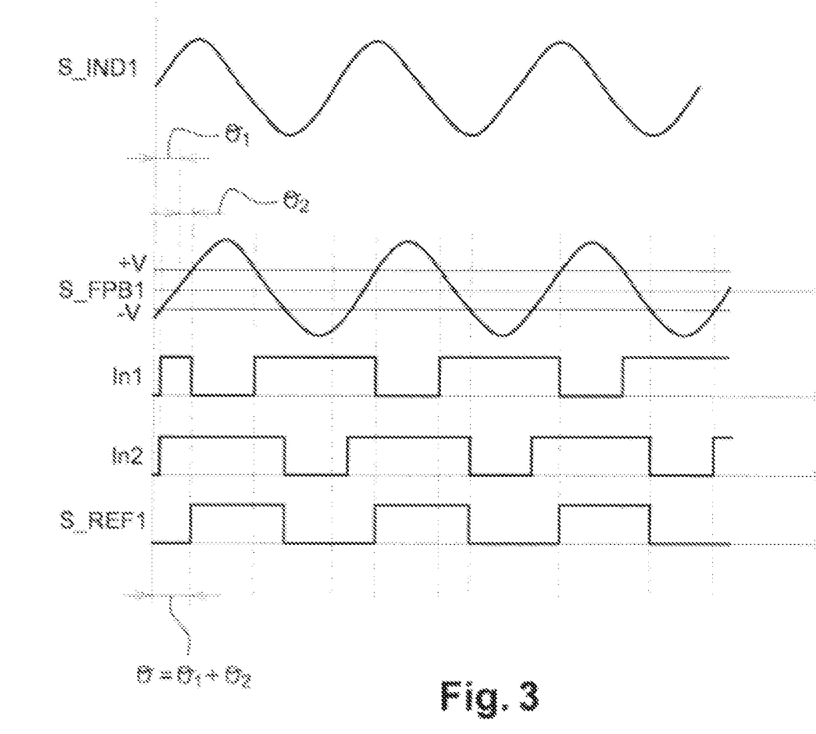
FIG. 3 is a representation of signals processed by the referencing module of FIG. 2.

As illustrated in FIG. 3, the rising transitions of the signal S_REF1 correspond to the passages of the signal S_FPB1 through the predetermined value +V_SEUIL, in the rising direction; the falling transitions of the signal S_REF1 correspond to the passages of the signal S_FPB1 through the predetermined value −V_SEUIL, in the falling direction.

The instants of passage of the signal S_FPB1 through the predetermined value +V_SEUIL, in the rising direction, have a delay θ2 relative to the passages of the same signal S_FPB1 through zero, in the rising direction; the instants of passage of the signal S_FPB1 through the predetermined value −V_SEUIL in the falling direction, have the same delay θ2 relative to the passages of the signal S_FPB1 through zero, in the falling direction.

Thus, the rising transitions of the signal S_REF1 have a delay θ2 relative to the passages of the signal S_FPB1 through zero, in the rising direction; the falling transitions of the signal S_REF1 have a delay θ2 relative to the passages of the signal S_FPB1 through zero, in the falling direction. The delay θ2 is identical for each of the optocouplers.

The input stage 10 comprises advantageously a resistance R connected in series to the light-emitting diodes 14a, 16a. The resistance R allows adjusting the threshold detection of the image signal S_FPB1 and consequently adjusting the delay θ2 introduced by the referencing module S_REF1.

An increase of the resistance R leads to an increase of the delay θ2 while a reduction of the resistance leads to a reduction of the delay θ2. Thus, the value of the delay θ2 in the determined frequency band can be adjusted and framed in the design phase.

At the output of the referencing module REF1 there is a signal S_REF1 whose transitions have a total delay θ relative to the instants of passage through zero of the actual signal of the counter-electromotive force S_IND1. This total delay θ, being equal to the sum of the two delays θ1 and θ2 introduced respectively by the two modules FPB1 and REF1, can be consequently adjusted and framed in the design phase.

The referencing modules REF1, REF2, REF3 can be connected to the transformation modules FPB1, FPB2, and FPB3 following a triangle topology, as illustrated in FIG. 1, or a star topology, as illustrated in FIG. 10. It should be noted that the topology of the connections between the referencing modules REF1, REF2, REF3 and the transformation modules FPB1, FPB2, and FPB3 is independent of the topology of the connections between the transformation modules FPB1, FPB2 and FPB3 and the terminals A, B, C of the windings. Thus, combinations (not illustrated) of a triangle topology of the connection of the transformation modules FPB1, FPB2, FPB3 to the terminals A, B, C, and a star topology of the connections between the referencing modules REF1, REF2 and REF3 and the transformation modules FPB1, FPB2 and FPB3 (or vice versa) fall within the scope of the invention. The control device CTRL also includes a digital processing module TR connected to the terminals of the output stages 12 of the referencing modules REF1, REF2 and REF3.

The processing module TR is designed to process the signals S_REF1, S_REF2 and S_REF3 so as to:
- generate the signals S_K1, S_K2, S_K3, S_K4, S_K5 and S_K6 of the control law; and/or
- count the number of revolutions performed by the rotor; and/or
- determine the position of the rotor.

A second embodiment of the control device CTRL will now be described; this variant of the control device CTRL is similar to the first one, except the referencing module REF1. Thus, the referencing module REF1
- receives in input the image signal S_FPB1, having the delay θ1, relative to the corresponding signal S_IND1; this delay θ1 can be framed in the design phase between the values θ1min and θ1MAX;
- outputs a signal S_REF1.

According to this second embodiment (shown in FIGS. 4 and 5) the referencing module REF1 comprises a single optocoupler. A detection of threshold on the image signal S_FPB1 occurs only on alternations of the signal S_FPB1.

Figure 5:
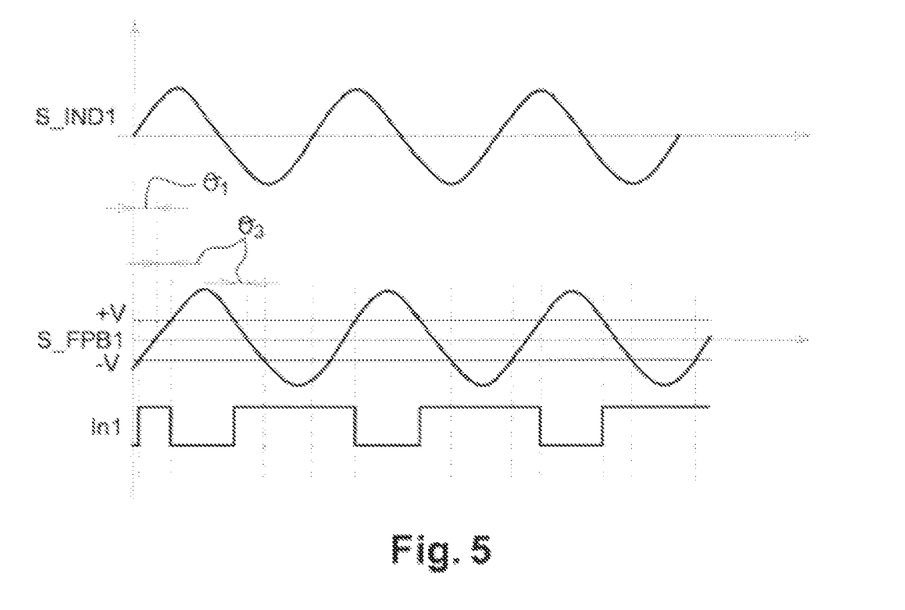
FIG. 5 is a representation of signals processed by the referencing module of FIG. 4.

As illustrated in FIG. 5, the falling transitions of the signal S_REF1 correspond to the passages of the signal S_FPB1 through the predetermined value +V_SEUIL, in the rising direction; the rising transitions of the signal S_REF1 correspond to the passages of the signal S_FPB1 through the same predetermined value +V_SEUIL, in the falling direction.

The instants of passage of the signal S_FPB1 through the predetermined value +V_SEUIL, in the rising direction, have a delay θ3 relative to the passages of the same signal S_FPB1 through zero, in the rising direction; the instants of passage of the signal S_FPB1 through the same predetermined value +V_SEUIL in the falling direction, have an advance θ3 relative to the instants of passage of the signal S_FPB1 through zero, in the falling direction.

Thus, the falling transitions of the signal S_REF1 have a delay θ3 relative to the passages of the signal S_FPB1 through zero, in the rising direction; the rising transitions of the signal S_REF1 have an advance θ3 relative to the passages of the signal S_FPB1 through zero, in the falling direction.

Figure 4:
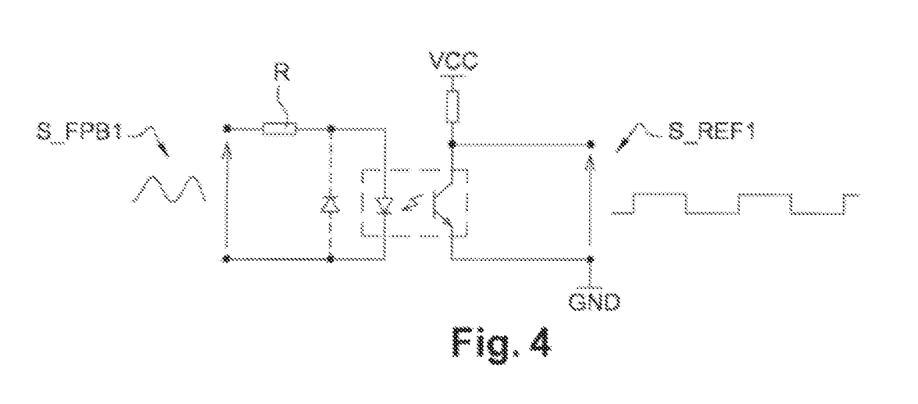
FIG. 4 is a schematic representation of a variant of the referencing module of the control device of FIG. 1.

The resistance R allows, in the same manner as in the first example, adjusting the detection threshold +V_SEUIL of the image signal S_FPB1 and therefore the delay, respectively the advance θ3.

It should be noted that if the conduction threshold of the optocoupler is much lower than the amplitude of the input signal, the delay, respectively the advance θ3 can be considered insignificant; the total delay θ of the transitions of the signal S_REF1 relative to the instants of passage through zero of the actual signal of the counter-electromotive force S_IND1 is substantially equal to the delay θ1 introduced by the transformation module FPB1. If not, the total delay θ will take the values θ1±θ3, respectively θ1-θ3.

At the output of the referencing module REF1 there is therefore a signal S_REF1 whose transitions present a total delay θ relative to the instants of passage through zero of the actual signal of the counter-electromotive force S_IND1 equal to θ1±θ3.

The signal S_REF1 is used by the digital processing module TR for generating signals S_Ki of the control law, counting the number of revolutions performed by the rotor and determining the position of the rotor by the control device CTRL.

Figure 9:
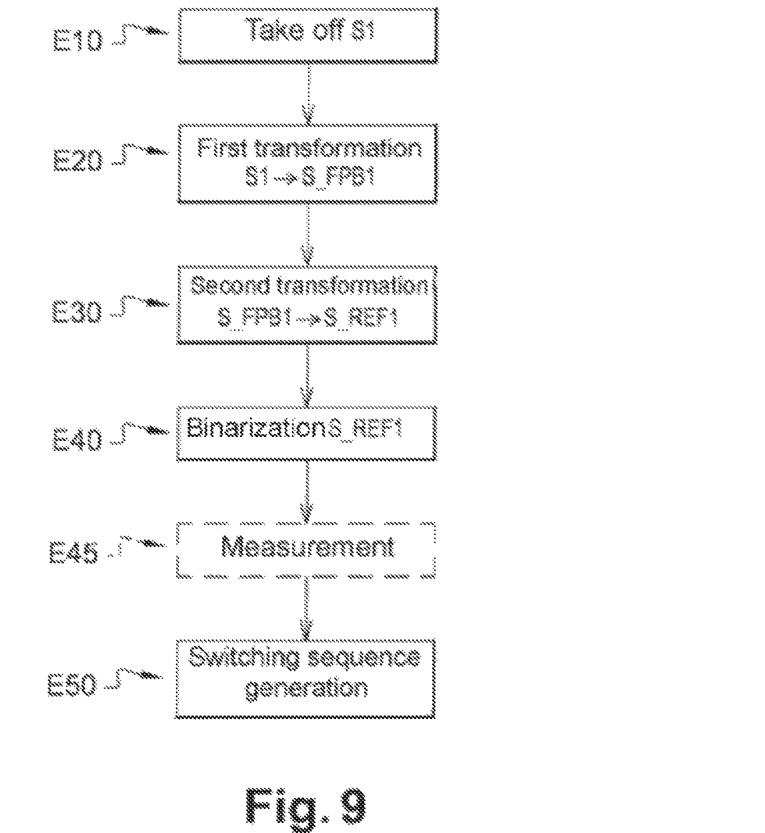
FIG. 9 is a flowchart of a control method according to the invention.

A motor M control method by the device CTRL is now described with reference to FIG. 9.

The motor M is driven by the control module COM which allows to select, according to a predetermined control law, for the terminals A, B, C of the windings, either a configuration connected to one of the terminals V, GND, of a referenced power supply source, ALIM, or a configuration disconnected from the terminals V, GND, of the power supply source ALIM.

The control law is divided into a succession of switching sequences corresponding to a set of states of the switches K1, K2, K3, K4, K5 and K6. The states of these switches are controlled by the signals S_K1, S_K2, S_K3, S_K4, S_K5 and S_K6, A first example of generation of the signals S_K1, S_K2, S_K3, S_K4, S_K5 and S_K6 from the signals S_REF1, S_REF2, S_REF3 will now be described. In this example the referencing modules REF1, REF2, REF3 are made according to the first embodiment (shown in FIGS. 2 and 3).

During a step E10, the transformation modules FPB1, FPB2, and FPB3 take off the source signals S1, S2, S3 at the terminals A, B, C of the windings E1, E2, E3.

During a step E20, the transformation modules FPB1, FPB2, and FPB3 transform the source signals S1, S2, S3 into floating image signals S_FPB1, S_FPB2, S_FPB3 representative of the signals of the counter-electromotive forces S_IND1, S_IND2, S_IND3 induced in the windings E1, E2, E3.

During steps E30 and E40, implemented simultaneously, the referencing modules transform the floating image signals S_FPB 1, S_FPB2, S_FPB3 into signals S_REF1, S_REF2, S_REF3, referenced relative to the fixed reference terminal GND and binarized.

During a step E50, the signals S_K1, S_K2, S_K3, S_K4, S_K5 and S_K6 are generated from the signals S_REF1, S_REF2, S_REF3 and from a predetermined control law and by applying a predetermined correction that takes into account the delays θ1, θ2 introduced respectively by the modules FPB1, FPB2, FPB3 and REF1, REF2, REF3.

To control the motor M optimally, the signals S_K1, S_K2, S_K3, S_K4, S_K5 and S_K6 must switch the switches K1, K2, K3, K4, K5 and K6 at each passage through zero of an actual signal of the counter-electromotive force S_IND1, S_IND2 and S_IND3 according to the known control laws.

The passages through zero of the counter-electromotive forces constitute theoretical switching moments.

Figure 7:
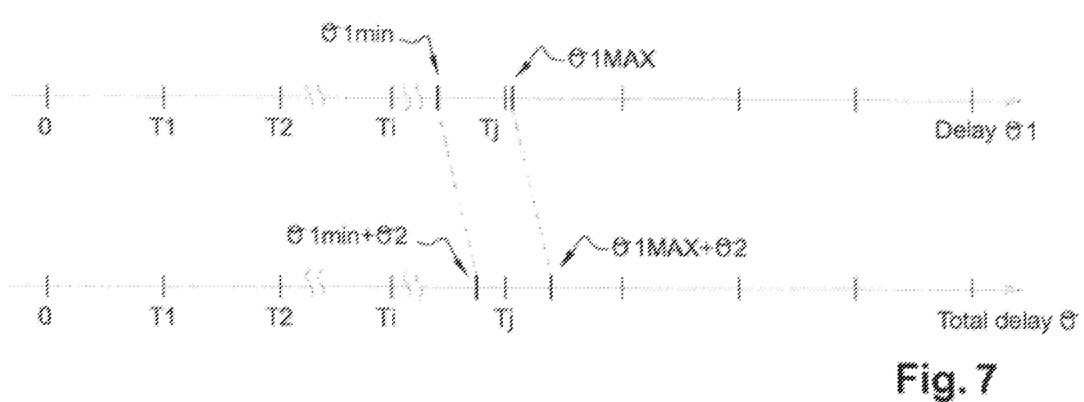
FIGS. 7 and 8 are diagrams illustrating delays of the signals processed by the modules of a device according to the invention.

In FIG. 7, for an application using three windings E1, E2, E3, the interval between two theoretical switching moments corresponds to one sixth of the electrical period. We will note this interval $\Delta T$ and these theoretical switching moments T1, Ti, Tj, etc.

According to known techniques, the passages through zero of the actual signal of the counter-electromotive force S_IND1, S_IND2 and S_IND3 are detected by hardware sensors or by calculation. A new switching sequence is generated in each thus detected passage, using hardware means, for example combinatorial logic circuits, software means, for example linked lists, or a combination of hardware and software means. It should be noted that the generation of the control sequences is cyclic in time.

According to the invention, the new switching sequences are generated during transitions of the signals S_REF1, S_REF2 and S_REF3. Due to the applied correction, the sending moments of the new switching sequences are located as close as possible to the theoretical switching moments to which these sequences must be sent.

In this manner, the switching sequences are sent in the expected order according to the known switching laws, and the gap between effective sending moments and the theoretical switching moments is limited.

As illustrated in FIG. 3, the image signal S_FPB1 presents a delay θ1 relative to the actual signal of the counter-electromotive force S_IND1. In particular, the moments of passage through zero of the signal S_FPB1 have a delay θ1 relative to the passages through zero of the signal S_IND1. The transitions of the signal S_REF1 have also a delay θ2 relative to the passages through zero of the image signal S_FPB1.

Thus, transitions of the signals S_REF1, S_REF2 and S_REF3 have a total delay θ relative to the instants of passage through zero of the actual signals of the counter-electromotive force S_IND1, S_IND2 and S_IND3, wherein the delay θ is equal to the sum of the delays θ1 and θ2.

As explained above, the passages through zero of the actual signal of the counter-electromotive force S_IND1, S_IND2, S_IND3 correspond to the theoretical switching moments. The transitions of the signals S_REF1, S_REF2 and S_REF3 therefore have the same total delay θ relative to these theoretical switching moments.

The total delay θ varies between two values, θmin and θMAX with $$\theta min=(\theta1min+\theta2) \text{ and } \theta MAX=(\theta1MAX+\theta2)$$

The range of values that the total delay θ can take has a width Δθ equal to:

$$((\theta1MAX+\theta2)-(\theta1min+\theta2))=(\theta1MAX-\theta1min)$$

In a first considered case, the simplest one, the gap Δθ between θ1MAX and θ1min, is lower than the interval ΔTs between two successive theoretical switching moments. By adjusting if necessary $\theta2$, we can obtain a range of possible values of the total delay $\theta$ distributed around a theoretical switching moment Tj, so as to obtain:

$$Tj-\Delta Ts/2<\theta min<\theta<\theta MAX<Tj+\Delta Ts/2$$

This case is illustrated in FIG. 7.

Regardless of the value of the total delay $\theta$ of the moment when the transition of the signal S_REF1 occurs, which is the moment t of effective sending of a new switching sequence SEQ_i, relative to the moment of passage through zero of the corresponding signal S_IND1, which is the theoretical moment Ti where this new sequence is expected, we obtain:

$$Tj-\Delta Ts/2<\theta<Tj+\Delta Ts/2$$

With $\theta=t-Ti$, we get:

$$Tj-\Delta Ts/2<t-Ti<Tj+\Delta Ts/2, \text{ or further}$$

$$Tj+Ti-\Delta Ts/2<t<Tj+Ti+\Delta Ts/2$$

Thus, the effective moment of sending an expected sequence SEQ_i at Ti is located, in this first case, always around the theoretical switching moment Ti+Tj.

To get the effective sending of a new switching sequence SEQ_i in accordance with the expected control law, that is to say, around the theoretical moment Ti where this sequence is expected, then it is necessary to send around the moment Ti+Tj the expected sequence at Ti, by anticipating the sending of the controls.

Since the sending of the switching sequences is cyclic, the sending of the controls with anticipation can be obtained according to the known techniques. For example, if the generation of the new sequences is performed by software, we can apply an additional delay T−Tj, wherein T is a generation cycle. In another example, the generation of the controls can be performed from a list associating, at each passage through zero of a signal S_IND1, S_IND2, S_IND3, a switching sequence. Since the generation of controls is cyclic, this table is of the type <<circular list>>. In such a table, in order to anticipate the sending of the first sequence of Tj, with j=1, we send the last element of the list; for j=2, we send the penultimate element of the list, and so on.

This correction is then called static, because the anticipation of the controls is always applied in the same manner. We seek to implement this static mode by sizing $\theta1$ and $\theta2$ such that $\Delta\theta<\Delta Ts$ and that the range of values $\Delta\theta$ is always distributed around one single theoretical switching moment Tj ($Tj-\Delta Ts/2<\theta<Tj+\Delta Ts/2$).

Figure 8:
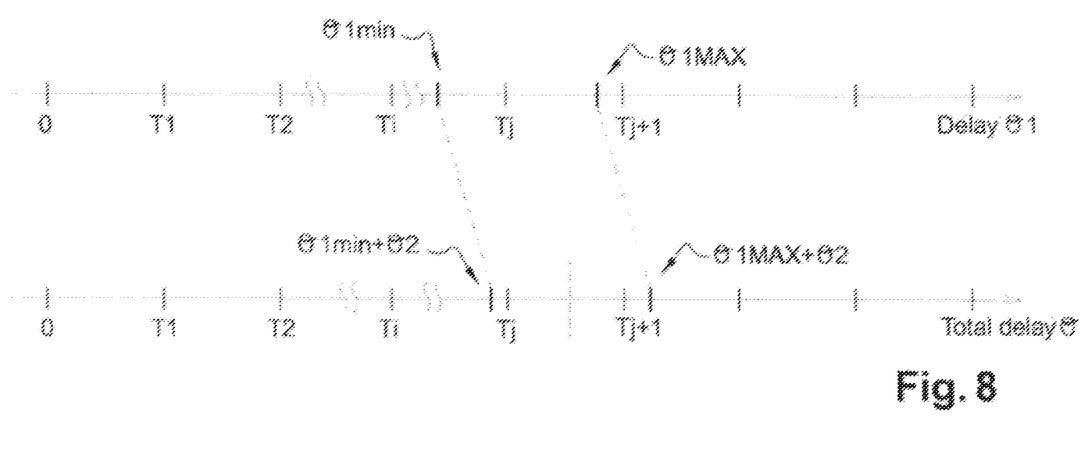

A second example of generation of the signals S_K1, S_K2, S_K3, S_K4, S_K5 and S_K6 of the control law is now described. This example is applicable if the gap $\Delta\theta$ between $\theta1MAX$ and $\theta1min$ is greater than the interval $\Delta Ts$ and/or is distributed around two theoretical switching moments Tj and Tj+1 (as shown in FIG. 8).

In this case, the closest theoretical switching moment is no longer unique for all the operating conditions. Consequently, it must be determined during operation, in order to apply the appropriate correction, called dynamic correction.

As in the first example, the referencing modules REF1, REF2, REF3 are made according to the first embodiment (shown in FIGS. 2 and 3).

The correction principle to be applied is the same as for the static correction, that is to say anticipating the sending of the control so as to send the expected control at Ti at the moment Ti+Tj, respectively Ti+Tj+1.

During the design phase, for given modules FPB1, FPB2, FPB3, the values of the delay $\theta1$ can be determined depending on the components constituting these modules and on the operating parameters (the motor speed, the motor torque, the current intensity in the windings, the temperature). The signals S_FPB1, F_PB2, FPB3, taken off at the output of the circuits FPB1, FPB2, FPB3 can be used for controlling, in the design phase, the values taken by the delay $\theta1$. The delay $\theta2$, introduced by the referencing modules, can be determined in the design phase through the selections of the components constituting these modules; it can be adjusted if necessary, thanks to the resistance R. Thus, for each value or set of values of the operating parameters, the total delay $\theta$ is known, the closest theoretical switching moment, and consequently the correction to be applied can be determined.

During the operating phase, the method includes the taking off E10, transformation E20 and E30 and binarizing E40 steps. It further includes a step E45 of measuring the operating parameter(s), the correction to be applied is selected from the predetermined values in the design phase, depending on the measured value of the operating parameter(s). This correction is then applied during step E50.

A third example of generation of the signals S_K1, S_K2, S_K3, S_K4, S_K5 and S_K6 of the control law is now described. In this third example, the referencing modules REF1, REF2, REF3 are made according to their second embodiment (shown in FIGS. 4 and 5).

The referencing modules REF1, REF2, REF3, include a single optocoupler. The total delay $\theta$ then varies between ($\theta1min-\theta3$) and ($\theta1MAX+\theta3$). By sizing $\theta1min$, $\theta1MAX$ and $\theta3$ such that $\Delta\theta<\Delta Ts$ and that the range of values $\Delta\theta$ is always distributed around a single theoretical switching moment Tj, the correction to be applied will be the same whatever the operating conditions are, and the steps of the method will be similar to the steps described for the first example of generation of the signals.

A fourth example of generation of the signals S_K1, S_K2, S_K3, S_K4, S_K5 and S_K6 of the control law is now described. This example is applicable if the gap $\Delta\theta$ between $\theta1MAX$ and $\theta1min$ is greater than the interval $\Delta Ts$ and/or is distributed around two theoretical switching moments Tj and Tj+1 (as shown in FIG. 8).

As for the third example, the referencing modules REF1, REF2, REF3 are made according to their second embodiment (shown in FIGS. 4 and 5) and the total delay $\theta$ varies between ($\theta1min-\theta3$) and ($\theta1MAX+\theta3$).

In the design phase, the variation of the delay $\theta$ can be determined depending on the operating parameters.

In the operating phase, a dynamic correction will be applied depending on the measured operating parameters, and the steps of the method will be similar to the steps described for the second example of generation of the signals.

A method for counting the number of revolutions of the rotor is now described.

When the motor is stopped, the processing module TR initializes to zero the value of a register. When the motor is started, the processing module TR increments the value of said register at each rising or falling edge of a determined signal S_REF1, S_REF2 and S_REF3. The value of the register indicates the number of revolutions performed by the rotor.

A method for determining the position of the rotor is now described: each sequence of the control law is associated with a position of the rotor. When the motor is stopped, the processing module TR memorizes in a register a value corresponding to the last sequence of the implemented control law. When the motor is started, the processing module updates the value of said register at each implemented sequence.

It goes without saying that the invention is not limited to the sole embodiments presented above, it encompasses on the contrary all the variants.

The invention claimed is:

1. A motor control device of the type comprising a stator and a rotor, the stator being provided with at least one winding, the motor being driven by a control module allowing to select, according to a predetermined control law, for the terminals of the at least one winding:
a configuration connected to one of the terminals of a power supply source referenced relative to a fixed reference terminal; and
a disconnected configuration of the terminals of the power supply source,
wherein the control device includes
at least one transformation module allowing to transform a source signal taken off at least at one of the terminals of the winding into a floating image signal representative of a counter-electromotive force induced in the winding, the transformation module having:
a time constant determined from characteristics of the motor and/or characteristics of the control module;
at least a first terminal connected to said at least one of the terminals of the winding, and a second terminal, the first and second terminals having a floating potential relative to the fixed reference terminal, the source signal being taken off between the first and second terminals;
in which the frequency of the counter-electromotive force induced in the winding varies in a determined frequency band; and
wherein the at least one transformation module is configured to:
keep the frequency components of the source signal which are comprised in the determined frequency band; and
cut the frequency components of the source signal which are not comprised in the determined frequency band;
wherein the control device further comprises at least one referencing module designed to transform the floating image signal into a referenced signal relative to the fixed reference terminal, wherein the floating image signal is continuously obtained and is representative of the counter-electromotive force induced in the winding, the referencing module comprising;
an input stage connected to the at least one transformation module; and
an output stage galvanically isolated from the input stage;
wherein the at least one referencing module comprises first and second optocouplers comprising respectively first and second light-emitting diodes, a resistor connected in series to the first and second light-emitting diodes, and first and second phototransistors, the anode of the first light-emitting diode being connected to the cathode of the second light-emitting diode and the anode of the second light-emitting diode being connected to the cathode of the first light-emitting diode;
wherein the at least one referencing module is designed to transform the floating image signal into a referenced signal relative to the fixed reference terminal and binarized taking:
a first predetermined value when the floating image signal at the terminals of the input stage is greater than a threshold; and
a second predetermined value when the floating image signal at the terminals of the input stage is smaller than the threshold;
further comprising a digital processing module connected to the at least one referencing module, designed to process the referenced and binarized signal output by the at least one referencing module so as to:
generate a succession of switching sequences according to the control law of the control module; and/or count the number of revolutions performed by the rotor; and/or determine the position of the rotor.

2. The device according to claim 1, wherein the second terminal of the at least one transformation module is connected to another terminal of the winding.

3. The device according to claim 1, wherein the second terminal of the at least one transformation module forms a floating reference terminal.

4. The device according to claim 1, wherein the control module has:
a plurality of switches capable of switching between an on-state and an off-state;
a plurality of freewheel diodes each connected parallel to a respective switch, such that at each switching of a switch from its on-state to its off-state, the winding discharges through a freewheel diode; and
wherein the time constant of the at least one transformation module is greater than or equal to the conduction time of each freewheel diode.

5. The device according to claim 1, wherein the time constant of the at least one transformation module is greater than or equal to the electrical time constant of the motor.

6. The device according to claim 1, wherein the at least one referencing module comprises means for adjusting the value of the threshold.

7. The device according to claim 1, wherein the motor is a brushless motor comprising three windings connected following a triangle or a star topology, and wherein the device includes:
three transformation modules each associated with a respective winding and connected following a triangle or a star topology relative to the terminals of the windings; and
three referencing modules connected following a triangle or a star topology relative to the transformation modules.

8. A method for controlling a motor of the type comprising a stator and a rotor, the stator being provided with at least one winding, the motor being driven by a control module allowing to select, according to a predetermined control law, for terminals of the at least one winding:
a configuration connected to one of the terminals of a power supply source referenced relative to a fixed reference terminal; and
a disconnected configuration of the terminals of the power supply source,
the method including:
a step of taking off at least one source signal at least at one terminal of the winding;
a first step of transforming the at least one source signal into at least one floating image signal representative of a counter-electromotive force induced in the winding;
a step of keeping the frequency components of the source signal (S1, S2, S3) which are comprised in the determined frequency band; and a step of cutting the frequency components of the source signal (S1, S2, S3) which are not comprised in the determined frequency band; and a step of transforming the floating image signal into a referenced signal relative to the fixed reference terminal and continuously obtaining the floating image signal;

wherein said transforming is performed by at least one referencing module comprising: first and second optocouplers comprising respectively first and second light-emitting diodes, a resistor connected in series to the first and second light-emitting diodes, and first and second phototransistors, the anode of the first light-emitting diode being connected to the cathode of the second light-emitting diode and the anode of the second light-emitting diode being connected to the cathode of the first light-emitting diode;

an input stage connected to at least one transformation module; and an output stage galvanically isolated from the input stage, wherein the at least one referencing module is configured to transform the floating image signal into a referenced signal relative to the fixed reference terminal and binarized by:

a first step of taking a first predetermined value when the floating image signal at the terminals of the input stage is greater than a threshold, a second step of taking a second predetermined value when the floating image signal at the terminals of the input stage is smaller than the threshold, and a step of processing the referenced and binarized signal output using a digital processing module connected to the at least one referencing module.

9. The method according to claim 8, further comprising:
a second step of transforming the at least one floating image signal so as to output at least one referenced signal relative to a fixed reference terminal.

10. The method according to claim 9, further comprising:
a step of generating a succession of switching sequences of the control module, from
the at least one referenced and binarized signal, and
the predetermined control law,
by applying a predetermined correction which takes into account at least one delay introduced during the transformation steps.

11. The method according to claim 10, wherein the correction applied is predetermined during a design phase depending on the electronic components constituting the transformation and referencing modules.

12. The method according to claim 10, wherein the correction applied is configured to take several predetermined values during a design phase, depending on ranges of values of at least one operating parameter, and wherein the method further includes a step of measuring the at least one operating parameter, the correction applied being selected among the predetermined values, depending on the measured value of the at least one operating parameter.

* * * * *

UNITED STATES PATENT AND TRADEMARK OFFICE
CERTIFICATE OF CORRECTION

| | |
|---|---|
| PATENT NO. | : 10,848,081 B2 |
| APPLICATION NO. | : 14/901050 |
| DATED | : November 24, 2020 |
| INVENTOR(S) | : Serge Bruno |

Page 1 of 1

It is certified that error appears in the above-identified patent and that said Letters Patent is hereby corrected as shown below:

On the Title Page

Item (22), should read:
(22) PCT Filed: June 26, 2014

Signed and Sealed this
Eighth Day of June, 2021

Drew Hirshfeld
*Performing the Functions and Duties of the
Under Secretary of Commerce for Intellectual Property and
Director of the United States Patent and Trademark Office*